United States Patent [19]

Gautier

[11] 4,345,310
[45] Aug. 17, 1982

[54] AIRCRAFT FLIGHT CONTROL PROCESS AND DEVICE

[75] Inventor: Bernard Gautier, Meudon, France

[73] Assignee: Societe Francaise d'Equipements pour la Navigation Aerienne, Villacoublay, France

[21] Appl. No.: 109,096

[22] Filed: Jan. 2, 1980

[30] Foreign Application Priority Data

Jan. 9, 1979 [FR] France ............................. 79 00441

[51] Int. Cl.³ ..................... G06F 15/50; G06G 7/78
[52] U.S. Cl. ................................. 364/429; 244/183; 244/185; 364/428
[58] Field of Search ............... 364/428, 429; 244/183, 244/184, 185, 186; 73/178 H, 178 T

[56] References Cited

U.S. PATENT DOCUMENTS

| | | | |
|---|---|---|---|
| 3,610,930 | 10/1971 | Lacy et al. ..................... | 244/183 X |
| 3,697,022 | 10/1972 | Autechaud et al. ............ | 244/184 X |
| 3,776,455 | 12/1973 | Gee .................................. | 364/429 |
| 3,819,914 | 6/1974 | Bettinger et al. .................. | 364/429 |
| 3,916,688 | 11/1975 | Dendy et al. ..................... | 73/178 T |

Primary Examiner—Jerry Smith
Attorney, Agent, or Firm—Browdy and Neimark

[57] ABSTRACT

The present invention deals with a flight control process and device for an aircraft approach and landing. More in particular, the invention in use simulates ILS by using an infrared radiation source at the desired landing site. The invention comprises the steps of determining an axis defined by the infrared radiation source, forming a predetermined guide slope line with respect to the horizontal and oriented according to a determined approach magnetic heading, recording the aircraft position with respect to the source, determining the angular deviations in azimuth and in elevation of the sighting axis with respect to the said glide slope line, and operating the aircraft flight controls to return said deviations to zero.

7 Claims, 3 Drawing Figures

AIRCRAFT FLIGHT CONTROL PROCESS AND DEVICE

The present invention deals with a flight control process and device for an aircraft such as an helicopter or aircraft, especially during the approach and landing phases.

It is more particularly related with, but not exclusively, a process and a device enabling an aircraft to land by night or under poor visibility conditions.

It is current knowledge that, nowadays, to obtain this result many processes exist such as, for instance:
the G.C.A. process (GROUND CONTROLLED APPROACH) according to which the whole approach maneuver is controlled from the ground by radio, the aircraft being fitted with no special equipment, and
the I.L.S. process (INSTRUMENT LANDING SYSTEM) requiring use of a ground installation which embodies the glide slope axis through intersection of two radioalignment planes, i.e. the "runway localizer" which marks the vertical plane lying in the runway axis and the "glide path" which marks a tilted plane and ensures the aircraft glide slope guidance. I.L.S. requires, on board the aircraft, a device for displaying deviations in azimuth and elevation so that the pilot (or the autopilot) can effect maneuvers to hold the aircraft on the glide slope axis.

It is obvious that these processes can be used only for landing at airfields especially equipped for the particular system. However, because of the installations required they cannot be applied in certain cases such as military applications (landing in an enemy area) or even certain civil applications and particularly for helicopter landings which, in contrast to conventional aircraft, can land almost anywhere including areas other than specially equipped airfields.

The present invention is therefore primarily intended for overcoming this obstacle by using no fixed ground installations during the approach and landing phases, and doing so, while retaining all of the advantages derived from the conventional processes the pilots are used to, especially, the I.L.S. process.

Moreover, it is well known that presently, many vehicles, for military use are provided with sighting systems, for observation, firing or even missile guidance.

These sighting systems currently allow the objective position to be identified with respect to the vehicle, by indicating the bearing and angular elevation of the sighting line particularly.

In many cases, sighting systems are used which consist of an infrared radiation directional detector provided for sensing infrared source radiations and indicating deviation between the sighting line and the infrared source.

If the infrared source forms the target to be reached, a servo system permanently adjusts the detector orientation towards the source while information corresponding to this orientation is used to adjust the firing.

In case the infrared source is located to the rear of a missile that must be remote controlled, the missile's flight remote control can be effected from information related to the detector so as to maintain it on the detector axis.

The latter is moreover constantly held oriented on the objective to be reached using a sighting system permanently held aligned with the said objective.

Thus, for preventing a redundancy of the existing equipment on board the aircraft, the invention intends to use, for the aircraft's approach and landing, by night or with a poor visibility, according to a procedure similar to that of the I.L.S. process, information delivered by an infrared sighting and guidance system of the type previously described.

The flight control process according to this invention consists in:
(1) determining a glide slope axis, comparable to the glide slope axis used in the I.L.S. process, the said axis
going through a point on the ground defined by a punctual source of infrared radiation, in a location corresponding to the desired point of impact of the wheels on the ground when the aircraft is landing;
forming a predetermined slope with respect to the horizontal, for instance of 3°;
being oriented according to an approach magnetic heading which could depend on the landing site topography.
(2) identifying the infrared radiation source position with respect to the aircraft, by sighting the said source through a sighting system provided with devices for determining bearing and the angular elevation of the sighting line.
(3) in determining angular deviations in azimuth (bearing) and in slope (elevation) of the sighting axis with respect to the said glide slope axis and
in operating the aircraft flight controls to return the said deviation to zero.

Of course, the sighting system according to this invention consists of a device intended for measuring the deviation between the sighting axis and the infrared radiation punctual source, and a servo device intended for adjusting its orientation so as to maintain this deviation to zero.

Moreover, to obtain a better accuracy, such a sighting system can be gyrostabilised conventionally. In that case the said servo device operates to make the rate gyros precess appropriately.

Instructions for practicing the present invention will be given below as a non-limitative example, referring to the included figures in which.

Figure 1:
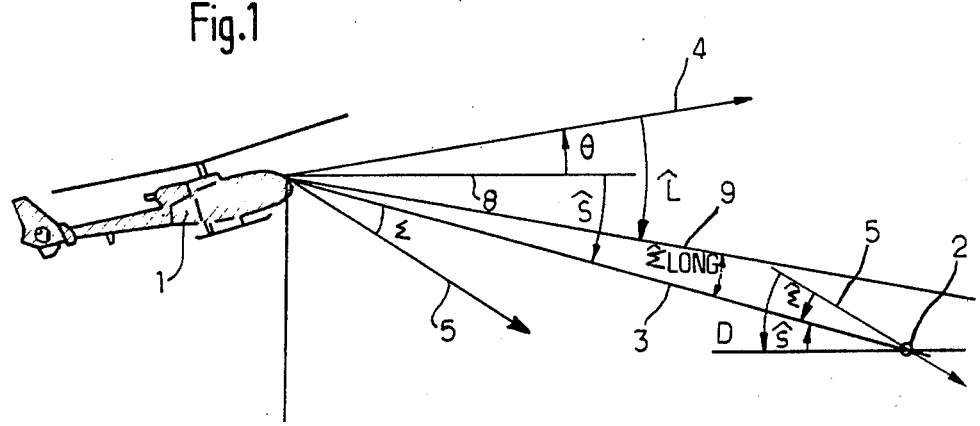
FIGS. 1 and 2 are two schematic illustrations for highlighting the main parameters of the invention as used with a helicopter, shown in the vertical plane (FIG. 1) and in the horizontal plane (FIG. 2).
Figure 2:
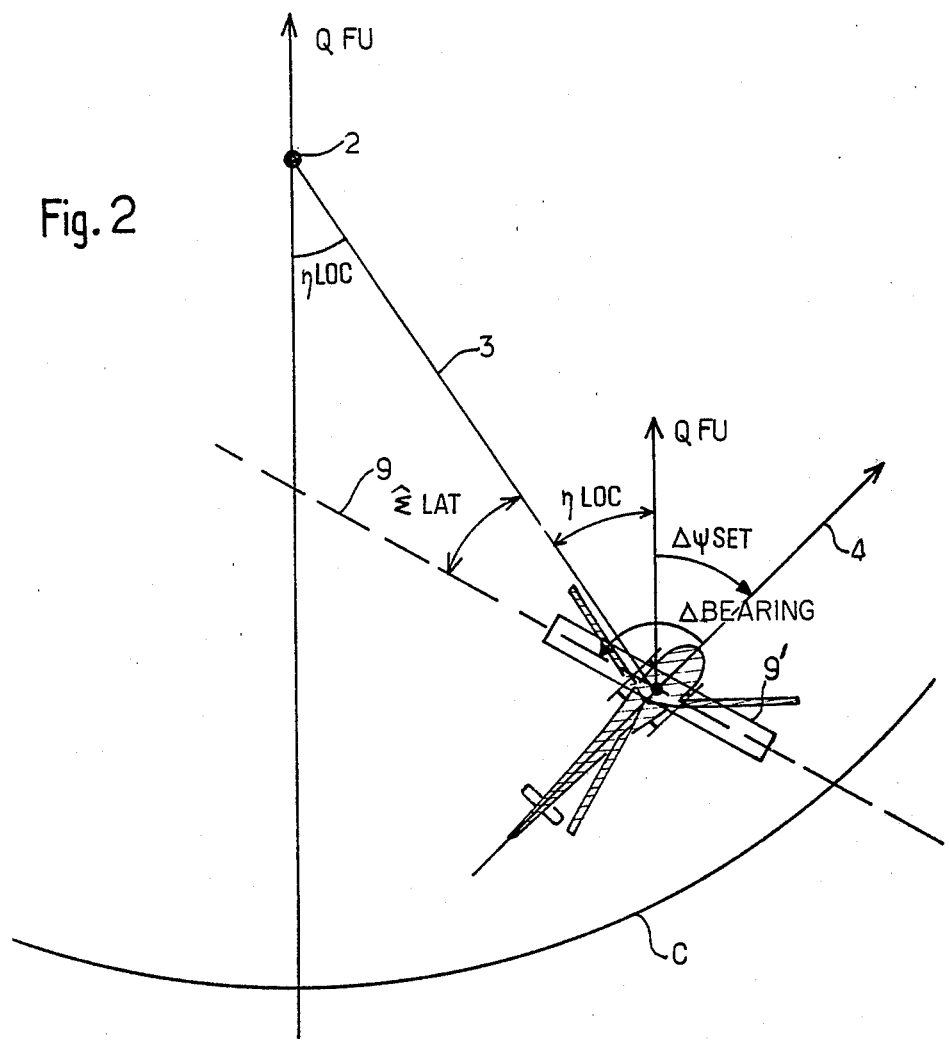

It is appropriate first of all to emphasize that the helicopter 1 as shown in FIGS. 1 and 2 is fitted with a sighting system held aligned with an infrared radiation punctual source 2 previously located, and even jettisoned to the place the aircraft is expected to land.

This sighting system can largely consist of the system fitting the helicopter for firing or even missile guidance (for instance antitank air-to-ground missiles).

It is to noted that such systems are usually gyrostabilised (i.e. fixed with respect to an inertial marking). A servo system causes the rate gyros to precess so as to maintain the punctural source on the sighting line 3. They also consist of equipment for determining the direction of the sighting line 3 in a coordinate system related to the helicopter 1. It is therefore possible through conventional projection to deduce angles $\hat{L}$ and $\hat{\Delta}$, the bearing of the infrared detector axis with the axis 4 of the helicopter and this, in the vertical and horizontal planes respectively.

Thus, the helicopter flight control, for the approach and the landing to a point embodied by the infrared radiation source 2 previously located or jettisoned in a selected location, according to a predetermined glide slope 5, for instance of 3°, and according to a determined magnetic heading, called below QFU, can be broken down as follows:

The first phase consists in bringing the helicopter 1 within a predetermined distance (radius or circle C) of the infrared radiation source 2 by using the flight control system on-board the aircraft.

This distance C must necessarily be selected to be within reach of the infrared sighting system on board the helicopter.

When the helicopter 1 is within the circle C. the infrared radiation source 2 can then be detected using the sighting system. Once the objective has been reached, using its servo system which is then triggered, computer 6 holds the infrared source 2 in alignment with the sighting line 3 of the sighting system in making the gyroscopes precess for reducing the deviation between the sighting line 3 and the said source 2 to zero.

Therefore, information related to the bearing and the elevation of the sighting line and deviations between the sighting line 3 and the infrared source, block 15 delivered by sensors associated with the sighting system are transmitted to a computer 6 (FIG. 3) which generates a $\eta$Loc signal (which can be compared to the signal currently called "Loc deviation" in the ILS process) which relates to in the angle formed by the sighting line 3 of the sighting system (when it lies in the infrared radiation source) and the approach magnetic heading QFU that has been selected. An error signal $\epsilon$, which can be compared to the signal commonly called "glide deviation" in the ILS process, which is the angle formed by the sighting line 3 and the glide slope plane 5 that has also been selected, is also generated by computer 6 in a similar manner.

It is obvious, that when flight controls are operated so as to bring the error signal $\epsilon$ and the $\eta$loc signal to zero, in a first phase, the helicopter will fly on the glide slope axis 5 which, by definition, lies in the infrared radiation source 2 and shows a determined slope D and a magnetic heading QFU, to then will keep in alignment with the glide slope axis 5.

For that purpose, with manual flight control, information related to the "Loc deviation" and "glide deviation" can be displayed using a flight director to indicate the helicopter's flight position to the pilot, and consequently, the maneuvers to be effected to bring the said signals $\hat{\epsilon}$ and $\eta$Loc to zero.

Alternatively, for automatic flight control, signals $\hat{\epsilon}$ and $\eta\hat{L}$oc can be transmitted to an autopilot's servo flight controls to obtain an identical result.

More precisely the error signal $\hat{\epsilon}$ results from the algebraic sum:

$$\hat{\epsilon} = \hat{\theta} + \hat{L} + \hat{D} + \hat{\epsilon}\text{long}$$

in which $\hat{\theta}$ is the helicopter attitude (angle formed by the axis 4 of the helicopter 1 and the horizontal line 8), this value being generated by a vertical reference unit commonly on board helicopters.

$\hat{L}$ is the angle formed by the axis 4 of the helicopter 1 and the axis 9 of the sighting system, this value being obtained by means of a detector, for instance a potentiometer associated with a sighting system.

$\hat{D}$ is the angle formed by the glide slope plane 5 and the horizontal line 8, this value being predetermined by the invention displayed to the pilot when initiating the approach and landing procedures.

$\hat{\epsilon}$ long is the angle formed by the axis 9 of the sighting system and the sighting line 3, projected on the vertical plane.

Moreover, the signal $\eta$Loc results from the algebraic sum:

$$\eta\hat{L}\text{oc} = \hat{\Delta}\text{Bearing} + \hat{\epsilon}\text{Lat} + \hat{\Delta}\Psi\text{Set}$$

in which:

$\hat{\Delta}$Bearing is the angle formed by the axis 4 of the helicopter and axis 9 of the sighting system.

$\hat{\epsilon}$Lat is the angle formed by the axis 9 of the sighting system and the sighting line 3, drawn in projection in the horizontal plane.

$\hat{\Delta}\Psi$Set is the angle formed by the axis 4 of the Helicopter and the approach magnetic heading QFU.

Figure 3:
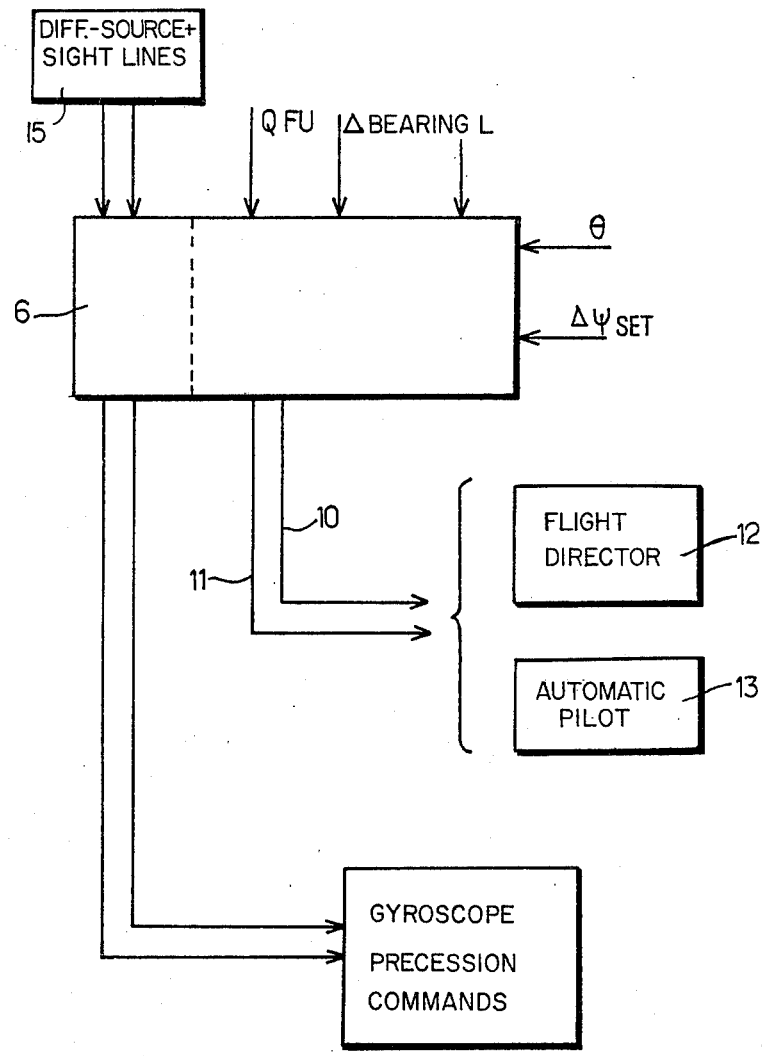
FIG. 3 shows a block-diagram of a flight control system according to the present invention.

Referring to FIG. 3 generation of the equivalent "Loc deviation" and the equivalent "glide deviation" (outputs 10 and 11) is due to the computer receiving information of:

the approach magnetic heading QFU
the Bearing angle $\hat{\Delta}$
the Elevation angle $\hat{\Delta}$
the pitch attitude $\hat{\theta}$
the angle $\hat{\Delta}\Psi$Set formed by the aircraft centerline and the approach magnetic heading QFU, and the angular deviation between the axis 9 of the sighting system and the infrared radiation source 2.

As previously indicated, the outputs 10 and 11 can be linked to the flight director 12 of the conventional type and/or to the autopilot 13 of the helicopter 1.

Moreover, computer 6 can generate the control signals for the rate gyros precession used for stabilising the sighting system (block 14), from information related to the angular deviation existing between the sighting system axis 9 and the infrared radiation source 2.

I claim:

1. A flight control process, especially for aircraft approach and landing along a glide slope axis similar to the glide slope axis used in the ILS process and forming a predetermined slope with respect to the horizontal, said process comprising the steps of:

(a) determining from on board the aircraft said glide slope axis going through a point on the ground marked by an infrared radiation point source corresponding to the desired point of impact of the aircraft's wheels on the ground during the desired landing of the aircraft, said axis forming a predetermined slope with respect to the horizontal of approximately 3°, said axis being oriented according to a predetermined approach magnetic heading that can depend on the topography of the desired landing site;

(b) recording the aircraft position with respect to said infrared radiation source by sighting said source along a sighting line using a sighting system on board the aircraft equipped with means to determine the bearing and angular elevation of said sighting line;

(c) determining the angular deviations in azimuth and angular deviations in elevation of the sighting axis with respect to said glide slope axis;

(d) and operating the flight controls of the aircraft to bring said deviations to zero.

2. The process according to claim 1, wherein said angular deviation in elevation consists of an error signal $\hat{\epsilon}$ obtained by algebraically adding up the attitude $\theta$ of the aircraft, angle $\hat{L}$ formed by the aircraft's axis and the sighting system sighting line, angle $\hat{D}$ formed by the glide slope plane and the horizontal, and angle $\hat{\epsilon}$Long formed by the axis of the sighting system and the sighting line projected on a vertical plane.

3. The process according to claim 1, wherein said angular deviation in azimuth consists of an error signal $\eta$Loc obtained by algebraically adding up the bearing angle $\hat{\Delta}$ formed by the aircraft axis and the sighting system axis, on angle Lat formed by the sighting system axis and the sighting line, and on angle $\Delta\psi$Set formed by the aircraft axis and the approach magnetic heading Q FU.

4. Apparatus for aircraft flight control during approach and landing comprising an infrared radiation source on the ground at a desired landing site, means to determine a glide slope line going through a point on the ground defined by said infrared radiation source, means for forming a predetermined slope line with respect to the horizontal and oriented according to a predetermined approach magnetic heading, a sighting system for the infrared source on board the aircraft adapted to furnish signals representing the bearing angle $\hat{\Delta}$ formed by the aircraft axis and the sighting system axis, angle $\hat{L}$ formed by the aircraft axis and the sighting line of said sighting system, angle $\Delta\psi$Set formed by the aircraft axis and the approach magnetic heading Q FU, angular deviation $\hat{\epsilon}$Long between the axis of the sighting system and the sighting line projected on a vertical plane, and angular deviation $\hat{\epsilon}$Lat formed by the axis of the sighting system and the sighting line projected on a horizontal plane, means to determine angle $\theta$ of the aircraft pitch attitude, computer means for receiving signals representing angles L,$\Delta\psi$Set, $\hat{D}$ bearing, and angular deviations $\hat{\epsilon}$Lat and $\hat{\epsilon}$Long, said computer means comprising means to obtain an error signal $\eta$Loc by algebraically adding $\Delta$bearing + $\hat{\epsilon}$Lat + $\Delta\psi$Set and error signal $\hat{\epsilon}$ by algebraically adding $\hat{\theta}+\hat{L}+\hat{D}+\hat{\epsilon}$Long, and means for receiving said error signals $\hat{\epsilon}$ and $\hat{\eta}$Loc.

5. The apparatus of claim 4, said error signal receiving means comprising a conventional flight director.

6. The apparatus of claim 4, said error signal receiving means comprising an autopilot.

7. The apparatus of claim 4, wherein said sighting system is gyrostabilized by means which comprises rate gyros, and wherein said computer comprises means to generate control signals for said rate gyros adapted to stabilize the sighting system from the information relating to the angular deviation formed between the sighting system axis and the infrared radiation source.

* * * * *